United States Patent
Ertler et al.

(10) Patent No.: US 12,377,991 B2
(45) Date of Patent: Aug. 5, 2025

(54) DEVICE AND METHOD FOR DELAYING THE OPENING OF A PARACHUTE AND A PARACHUTE SYSTEM

(71) Applicant: Paratec North America, Inc., Pinebluff, NC (US)

(72) Inventors: Stefan Ertler, Neunkirchen les Bouzonville (FR); Jens Klaudtky, Magdeburg (DE)

(73) Assignee: Paratec North America, Inc., Pinebluff, NC (US)

( * ) Notice: Subject to any disclaimer, the term of this patent is extended or adjusted under 35 U.S.C. 154(b) by 0 days.

(21) Appl. No.: 18/243,689

(22) Filed: Sep. 8, 2023

(65) Prior Publication Data

US 2024/0083586 A1  Mar. 14, 2024

(30) Foreign Application Priority Data

Sep. 9, 2022 (LU) .......................................... 502775
Sep. 6, 2023 (EP) ..................................... 23195761

(51) Int. Cl.
*B64D 17/34* (2006.01)
*B64D 17/80* (2006.01)

(52) U.S. Cl.
CPC ........... *B64D 17/343* (2013.01); *B64D 17/80* (2013.01)

(58) Field of Classification Search
CPC ........ B64D 17/74; B64D 17/78; B64D 17/80; B64D 17/343; B64D 17/38
See application file for complete search history.

(56) References Cited

U.S. PATENT DOCUMENTS

| | | | | |
|---|---|---|---|---|
| 2,732,153 | A | * | 1/1956 | Frieder .................. B64D 17/34 30/DIG. 4 |
| 2011/0121138 | A1 | * | 5/2011 | Walsh .................... B64D 17/74 244/149 |
| 2016/0150360 | A1 | * | 5/2016 | Pope ........................ H04W 4/02 340/8.1 |

FOREIGN PATENT DOCUMENTS

| | | | |
|---|---|---|---|
| CN | 115352640 A | * | 11/2002 |
| CN | 114162332 A | * | 3/2022 |
| DE | 10245944 A1 | | 4/2004 |

* cited by examiner

*Primary Examiner* — Arfan Y. Sinaki
(74) *Attorney, Agent, or Firm* — Meunier Carlin & Curfman LLC

(57) ABSTRACT

A device for delaying the opening of a parachute of a person jumping exiting an aircraft or of a cargo dropped from an aircraft, characterized by a delaying means designed to provide a connection between a drogue parachute connectable with a detachable connection to the aircraft and a parachute bridal line, said delaying means being movable from a delaying position in which no deployment of the parachute takes place, to a deployment position in which the parachute is deployed. A delay of the opening of the parachute, defined as the time required for the movement from the delaying position to the deployment position, can be between 0.5 seconds and 2 seconds by suitable design of the delaying means. Advantageously, the deployment of the parachute is delayed and occurs outside a wake turbulence of the aircraft.

19 Claims, 3 Drawing Sheets

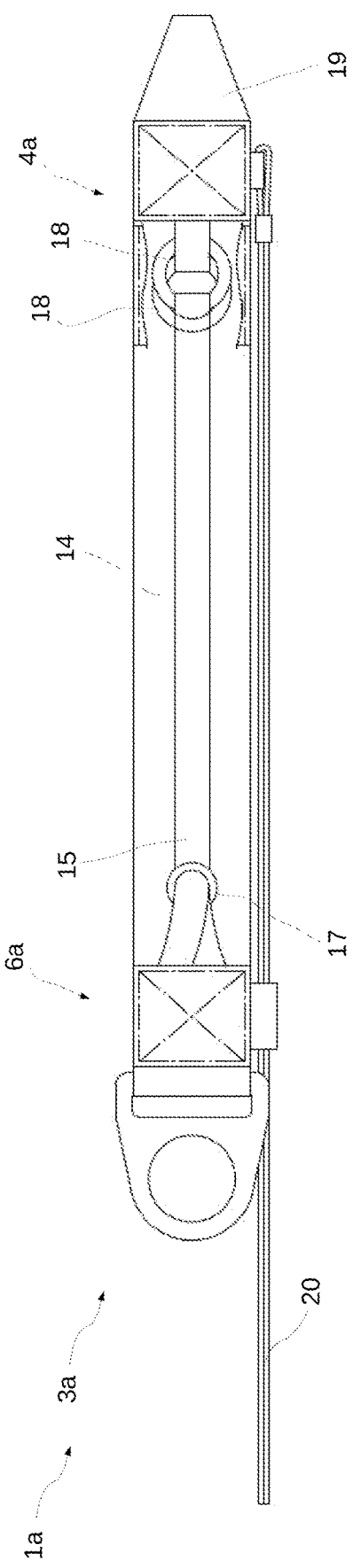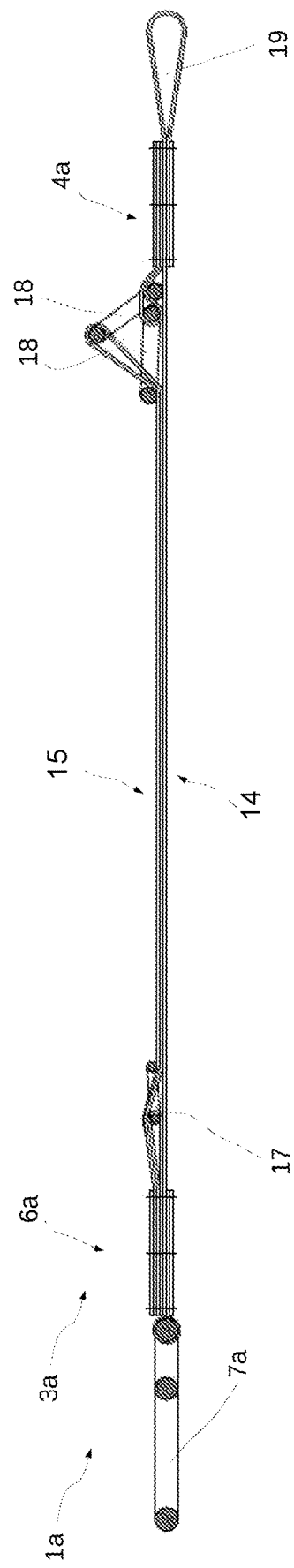

DEVICE AND METHOD FOR DELAYING THE OPENING OF A PARACHUTE AND A PARACHUTE SYSTEM

CROSS REFERENCE TO RELATED APPLICATIONS

This application claims the priority of LU 502775 filed on 2022 Sep. 9, and of EP 23195761 filed on 2023 Sep. 6; these applications are incorporated by reference herein in their entirety.

BACKGROUND

The invention relates to a device for delaying the opening of a parachute, in particular a personnel parachute or a cargo parachute, of a person exiting an aircraft or of a cargo dropped from an aircraft. Furthermore, the invention relates to a method for the delaying of the opening of a parachute and to a parachute system.

Round canopy parachutes, with which parachutists exit through side doors of an aircraft, are known from military use. After jumping out of the airplane, the parachute is deployed i.e. released by a static line that is firmly connected to the airplane, and the parachutist sinks to the ground hanging from the parachute.

In a similar manner, a cargo can be dropped from an aircraft at a so-called cargo parachute, preferably through an open tailgate of the aircraft.

It is problematic that the parachute is deployed immediately after exiting or dropping the cargo, so that the parachutist or the cargo can be caught by a wake turbulence generated in the tail area of the aircraft.

It is particularly dangerous when parachutists exit the aircraft on both sides or cargo and their opened parachutes collide shortly after their deployment. This is called "centerlining" and can lead to a collision.

This problem can be avoided if the parachute, which may be a round canopy parachute, is deployed with a delay, for example outside the wake turbulence at a sufficiently large distance from the aircraft and any adjacent parachutists or cargo.

The danger of a wake turbulence for deploying parachutes increases with increasing airdrop speed, i.e. a speed of the aircraft when the parachutist exits or a cargo is dropped, the typical airdrop speed is 240 km/h.

Modern aircraft, especially those for military applications, fly much faster. Airdrop speeds of up to 315 km/h are conceivable. To prevent damage or risk of accident to the parachutist or loss of cargo due to a collision, a deployment of the parachute, regardless of whether it is a personnel parachute or a cargo parachute, should take place outside the wake turbulence and thus be delayed.

SUMMARY

The invention relates to a device (1) for delaying the opening of a parachute (2), in particular a personnel parachute or a cargo parachute, of a person jumping exiting an aircraft (12) or of a cargo dropped from an aircraft (12), characterized by a delaying means (3; 3a) designed to provide a connection between a drogue parachute (5) connectable with a detachable connection to the aircraft (12) and a parachute bridal line (9), said delaying means (3; 3a) being movable from a delaying position in which no deployment of the parachute (2) takes place, to a deployment position in which the parachute is deployed. A delay of the opening of the parachute, i.e. the time required for the movement from the delaying position to the deployment position, can be between 0.5 seconds and 2 seconds by suitable design of the delaying means. Advantageously, the deployment of the parachute is delayed and occurs outside a wake turbulence of the aircraft.

DETAILED DESCRIPTION

The invention is therefore based on the task of creating a device of the type mentioned at the beginning, by means of which the safety of a person airdropped from an aircraft with a parachute is considerably improved.

Furthermore, the invention is based on the task of creating a device of the type mentioned at the beginning, by means of which a parachutist exiting an aircraft or a cargo to be dropped from an aircraft can be dropped at a higher airdrop speed.

According to the invention, the problem is solved by a delaying means designed to provide a connection between a drogue parachute connectable with a detachable connection to the aircraft and a parachute bridal line, said delaying means being movable from a delaying position, in which no deployment of the parachute takes place, to a deployment position, in which the parachute is deployed.

When a parachutist exits the aircraft or when a cargo is airdropped from the aircraft, an drogue parachute is deployed by a drogue static line connected to the aircraft. Through the opened drogue parachute, a force acts on the delaying means to move it from the delaying position to the deployment position during a free fall of the parachutist or cargo. Once the deployment position is reached, the drogue parachute acts directly on a parachute bridal line via the delaying means and deploys the parachute it with a time delay. A delay in the deployment of the parachute, i.e. the time required for movement from the delaying position to the deployment position, can be between 0.5 seconds and 2 seconds by suitable design of the delaying means.

Assuming an aircraft speed of approximately 250 km/h, the parachutist or cargo container can be located approximately 100 to 200 meters horizontally and vertically away from the aircraft during the delayed opening of the parachute and thus far outside a wake turbulence or sufficiently far away from a neighboring parachutist or cargo.

Furthermore, the invention is based on the task of creating a parachute system, in particular a personnel parachute system or a cargo parachute system, by which a risk of crash is significantly reduced and which can be used, for example, for military purposes.

According to the invention, this task is solved in that the parachute system has a device for delaying the opening.

It is understood that an existing parachute system, in particular a personnel parachute system or a cargo parachute system such as used for military purposes, can be fitted with the device and returned to its original configuration according to the invention for delaying the opening of a parachute. Advantageously, the delaying device according to the invention can be retrofitted and used with an existing parachute system, that is, it is intended to supplement an existing parachute system.

The delaying means is conveniently of strapped construction and comprises a connecting main strap and a delaying strap.

The deceleration strap is that part of the device according to the invention which enables a delayed opening of the parachute. The connecting main strap and the delaying strap can be designed as a webbing or as a line, preferably as a webbing.

It is conceivable that the delaying strap is designed as a restoring means, for example in the manner of a bungee rope.

In particular, the delaying means of a strapped construction can be designed in such a way that the connecting main strap is free of tension in a longitudinal direction of the connecting main strap during the movement from the delaying position to the deployment position. That is to say, a force acting on the delaying means of the strapped construction during movement from the delaying position to the deployment position acts on the delaying strap, but not or only insignificantly on the connecting main strap. For this purpose, an end of the delaying means of the strapped construction facing a parachute can be connected to a parachute bridal line and a so-called outer package of the parachute in such a way that no force acts on a parachute bridal line during a movement from the delaying position to the deployment position. When the deployment position is reached, the connection with the outer package, which is designed as a detachable connection, is released so that the delaying means can act directly on the parachute bridal line and the parachute is deployed.

In one embodiment of the invention, a distance between ends of the connecting main strap in the delaying position is smaller than in the deployment position. For example, the connecting main strap may be collapsed in the delaying position such that ends of the connecting main strap are arranged directly adjacent to or above each other in a longitudinal direction of the connecting main strap. Advantageously, a purely mechanical device for delaying the opening of a parachute is provided. Further advantageously, this is particularly resistant and can be used and stored in any weather.

In one embodiment of the invention, the delaying means comprises a guiding means connected to said connecting main strap. By means of the guiding means, the delaying strap is guided, for example frictionally, in such a way that a time required for a movement from the delaying position to the deployment position can be adjusted.

The guiding means can have at least one, preferably two guiding elements, which are arranged offset with respect to each other in a longitudinal direction of the connecting main strap and are connected to the connecting main strap. Preferably, that at least one guiding element is annular and made of a metal such as steel.

If at least two, in particular annular, guiding elements are provided, they can be arranged in pairs overlapping one after another in the longitudinal direction of the connecting main strap. Advantageously, by guiding the delaying strap through these guiding elements, a time required for the movement from the delaying position to the deployment position can be tailored for different applications.

In a further embodiment of the invention, the delaying means comprises a guiding means designed to deflect the delaying strap. By deflecting the delaying strap, for example by at least two guiding elements of the guiding means, not only a time required for the movement from the delaying position to the deployment position can be adjusted, but the delaying means can be designed to be particularly compact. The more deflections are provided, the longer said time will be.

It is convenient that the delaying strap extends in a circuitous manner both in the delaying position and in the deployment position. Preferably, the delaying strap has fewer turns in the deployment position than in the delaying position. Advantageously, a particularly compact, purely mechanical device for delaying the opening of the parachute is designed.

In one embodiment of the invention, ends of the delaying strap are connected to the connecting main strap at one end of the connecting main strap. Preferably, the ends are connected to the connecting main strap at a single location. Defects where material failure may occur are advantageously minimized, thereby simplifying quality inspection. In particular, a guiding element of a guiding means for guiding the delaying strap can be arranged at a second end of the connecting main strap facing away from the first end and can be connected thereto. The guiding element may, for example, be designed to deflect the delaying strap. The use of several guiding elements is conceivable.

Expediently, the delaying means comprises a retaining member arranged at an end of the connecting main strap facing the parachute, the retaining member being connected to a counter-retaining member and to the parachute bridal line, the connection to the counter-retaining member being provided as a detachable connection.

The counter-retaining member is preferably arranged on the so-called outer packaging of the parachute. The outer packaging is that part of a parachute system which is connected to a harness in which a parachutist or a cargo is located.

The releasable connection of the retaining element to the counter-retaining element ensures that when the delaying means moves from the delaying position to the deployment position, no force acts on the parachute bridal line that could cause premature opening of the parachute. When the deployment position is reached, the detachable connection of the retaining element with the counter-retaining element is detached and the connecting main strap acts on the parachute bridal line, which deploys the parachute.

The detachable connection of the retaining element to the counter-retaining element may be, for example, designed as a three-ring system known to those skilled in parachuting, in which a three-ring connecting strap is guided through one or more retaining eyelets which hold the rings in a connecting position. When the three-ring connecting strap, which may be of multi-strap design, is pulled out of the holding eye or eyes, the detachable connection is detached. The three-ring system allows a highly tensile loaded connection to be detached in a reliable manner and with little effort. In addition, a three-ring connection is particularly easy to establish and can detach.

It is understood that the detachable connection can be designed as a two-ring, four-ring or five-ring connection A method according to the invention for delaying the opening of a parachute, in particular a personnel parachute or a cargo parachute, is characterized in that a drogue parachute is released during an exit of the person or dropping a cargo from the aircraft, and the drogue parachute acts on a delaying means connecting the drogue parachute to a parachute bridal line in such a way that the delaying means is moved from a delaying position to a deployment position in which the parachute is deployed.

In one embodiment of the method, a distance between ends of a connecting main strap of the delaying means is increased during a movement from the delaying position to the deployment position, and the parachute is deployed in the deployment position.

In a parachute system according to the invention, in particular a personnel parachute system or a cargo parachute system, a drogue parachute connectable with a detachable connection to an aircraft expediently comprises a drogue parachute packaging sleeve connected to the drogue parachute and connectable with a detachable connection to an drogue parachute static line, wherein the drogue parachute static line is designed to connect the drogue parachute to the aircraft.

After a parachutist using the parachute system and parachuting from an aircraft, or a cargo dropped from the aircraft, only the drogue parachute static line remains on the aircraft, in contrast to systems known from prior art. Advantageously, the parachute system can be repacked immediately after a landing of the parachutist or the cargo.

BRIEF DESCRIPTION OF THE DRAWINGS

The invention is explained in more detail below with reference to examples of embodiments and the accompanying drawings relating to the examples of embodiments. Showing:

FIG. 2C shows details of a device for delaying the opening of a personnel parachute in the deployment position in a top view; and FIG. 2D shows details of a device for delaying the opening of a personnel parachute in the deployment position in a cutaway side view.

DETAILED DESCRIPTION OF THE PREFERRED EMBODIMENTS

Figure 1:
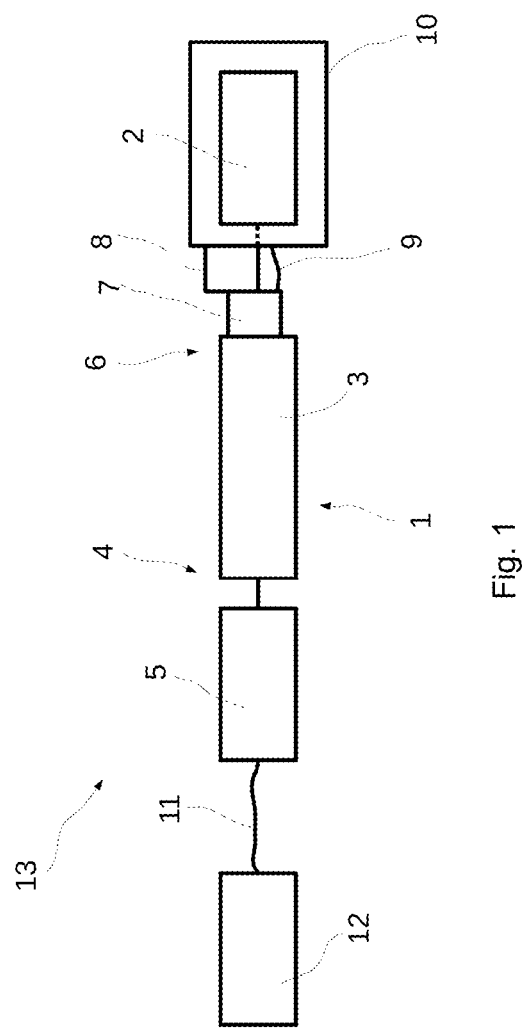
FIG. 1 shows a parachute system according to the invention.

A device 1 for delaying the opening of a personnel parachute 2, shown schematically in FIG. 1, comprises a delaying means 3 of strapped construction, which is connected at a first end 4 to a drogue parachute 5 and at a second end 6 by a retaining member 7 to a counter-retaining member 8 and a parachute bridal line 9 of the parachute 2. The counter-retaining member 8 is connected with a detachable connection to the retaining member 7 by a three-ring connection and is attached to an outer package 10 of the personnel parachute 2. The drogue parachute 5 is connected with a detachable connection to an aircraft 12 by a drogue parachute static line 11 such that when the drogue parachute 5 is deployed, only the drogue parachute static line 11 remains on the aircraft 12. A drogue parachute packaging sleeve not shown in FIG. 1 is connected to the drogue parachute 5.

A personnel parachute system 13 according to the invention comprises at least the components designated in this embodiment with the reference numbers 1 to 3, 5, 7 to 9 and 10.

When a parachutist exits the aircraft 12, the drogue parachute static line 11 opens the drogue parachute 5, causing a force to act on the delaying means 3, which is connected with a detachable connection to the counter-retaining member 8 by the retaining member 7, to move the delaying means 3 from a delaying position to a deployment position. In the deployment position, the connection of the counter-retaining member 8 to the retaining element 7 is detached, so that the force acting on the delaying means 3 from the drogue parachute 5 acts directly on the personnel parachute bridal line 9 and the personnel parachute 2 is deployed, i.e. opened. A delayed opening of the parachute 2 takes place.

During the movement of the delaying means 3 from the delaying position to the deployment position, the parachutist moves far enough away from the aircraft 12 in the vertical and horizontal direction so that an opening of the parachute 2 takes place outside a wake turbulence of the aircraft 12 and sufficiently far away from another parachutist.

Reference is now made to FIGS. 2A-2D, where identical or similarly acting parts are designated by the same reference number as in FIG. 1, and the letter a is added to the reference number in question in each case.

Figure 2A:
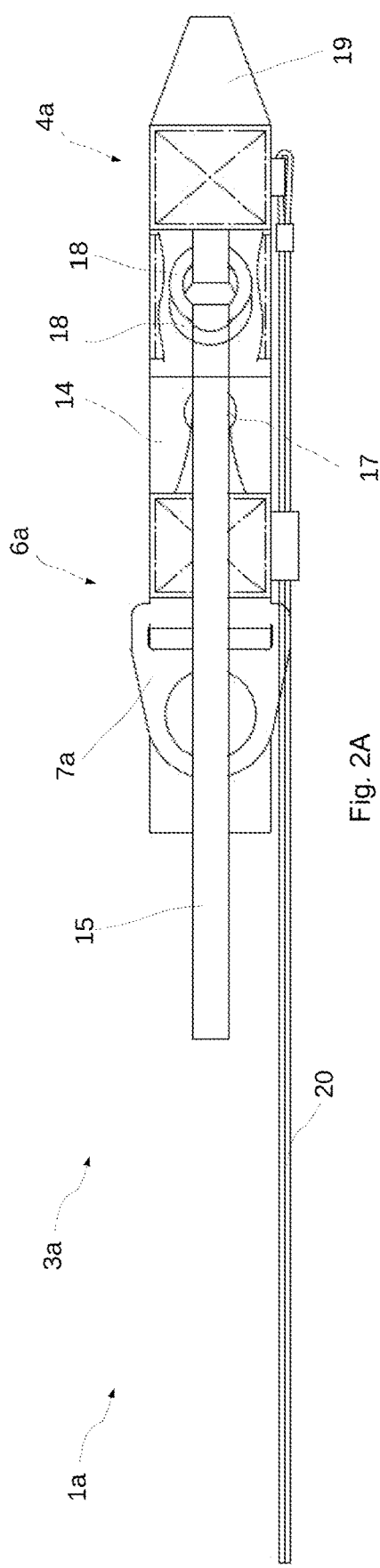
FIG. 2A shows details of a device for delaying the opening of a personnel parachute a plan view.
Figure 2B:
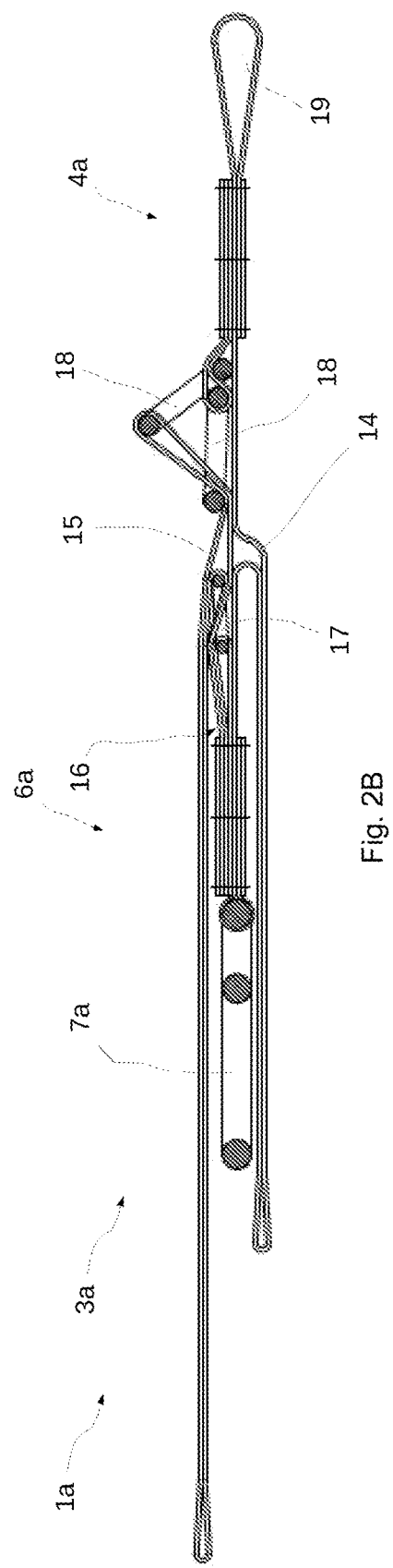
FIG. 2B shows details of a device for delaying the opening of a personnel parachute in a cut side view.

A device 1a for delaying the opening of a personnel parachute shown in FIG. 2A in a plan view and in FIG. 2B in a cut side view in a delaying position comprises a delaying means 3a of a strapped construction having a connecting main strap 14 and a delaying strap 15, wherein ends 16 of the delaying strap 15 are connected to the connecting main strap 14 at a second end 6a of the delaying means 3a. In order to improve the stability of the connection of strap ends 16, these can be connected, in particular sewn, to one another as well as to the connecting main strap 14, forming a stack, provided that the strap 14, 15 are formed from a plastic belt.

In the delaying position in this embodiment, the connecting main strap 14 in the delaying position is circuitous with one winding.

The delaying strap 15 is guided through a plurality of metal guiding rings 17, 18, the two metal guiding rings 18 being connected to the delaying means 3a at a first end 4a thereof and being arranged one behind the other in an overlapping manner in a connecting main strap longitudinal direction. In the delaying position shown, the delaying strap 15 is circuitous with a plurality of windings. This is shown in detail in FIG. 2b.

At the first end 4a of the delaying means 3a of a strapped construction, there is also a loop 19 arranged for a connection to a drogue parachute static line of a drogue parachute not shown in FIGS. 2A-2D and designated with reference number 11 in FIG. 1.

A retaining member 7a designed to provide a detachable connection with a counter-retaining member designated with reference number 8 in FIG. 1 is attached to the second end 6a of the delaying means 3a of a strapped construction.

Laterally attached to the delaying means 3a is a double-stranded securing cable 20, which is provided for securing the detachable connection of the retaining member 7a, not shown in detail in FIGS. 2A-2D, to a counter-retaining member 8 shown in FIG. 1.

The delaying means 3a is shown in FIGS. 2C and 2D in the deployment position, of which FIG. 2C is a top view and FIG. 2D is a cutaway side view.

In the deployment position, the ends 4a, 6a, of the delaying means 3a are further apart from each other in the longitudinal direction of the connecting main strap than in the delaying position.

In addition, the connecting main strap 14a is no longer collapsed in a meandering manner, but extends in a straight manner. In the deployment position, a force required to deploy a parachute and applied by the opened drogue parachute acts directly through the connecting main strap 14a on a parachute bridal line not shown in FIG. 2 and deploys the parachute.

The delaying strap 15a is still collapsed in a meandering manner, but now has only one winding, i.e. it is guided once through the two metal guiding rings 18 as shown in FIG. 2d.

It is understood that a device according to the invention for delaying the opening of a parachute is also suitable for use with a cargo parachute.

A parachute system according to the invention may further be designed as a cargo parachute system.

The invention claimed is:

1. A device for delaying opening of a parachute of a person exiting an aircraft or of a cargo dropped from the aircraft, wherein the device comprises:
    a delay element for connecting a drogue parachute connectable with a detachable connection to the aircraft and a parachute bridal line,
    wherein the delay element is actuatable from a delaying position, in which no deployment of the parachute connected to the parachute bridal line takes place, to a deployment position, in which the parachute connected to the parachute bridal line is deployed;
    wherein the delay element comprises a main strap, a delaying strap, and a plurality of guides connected to the main strap; and
    wherein the plurality of guides frictionally engage with and deflect the delaying strap passing circuitously therethrough as the delay element actuates from the delaying position to the deployment position.

2. The device according to claim 1, wherein the delay element further comprises a first end and a second end, and wherein a distance between the first end and the second end is smaller in the delaying position than in the deployment position.

3. The device according to claim 1, wherein the delaying strap extends in a circuitous manner through the plurality of guides both in the delaying position and in the deployment position.

4. The device according to claim 1, wherein the delaying strap comprises a first delaying strap end and a second delaying strap end; wherein the main strap comprises a first main strap end and a second main strap end; and wherein the first delaying strap end and the second delaying strap end are both connected to the main strap at the first main strap end.

5. The device according to claim 4, wherein the delay element further comprises a loop coupled to the second main strap end.

6. The device according to claim 1, wherein the delay element further comprises a retaining member connected to the main strap which is detachably connectable to a counter-retaining member and to the parachute bridal line.

7. The device according to claim 1, wherein the delaying strap comprises a first delaying strap end and a second delaying strap end; wherein the main strap comprises a first main strap end and a second main strap end; and wherein the first delaying strap end and the second delaying strap end are both connected to first main strap end forming a first stack.

8. The device according to claim 7, wherein the second main strap end is connected to a loop forming a second stack; and
    wherein the first stack and the second stack are positioned at opposing ends of the delay element.

9. The device according to claim 7, wherein the first delaying strap end and the second delaying strap end are both sewn to the first main strap end, thereby forming the first stack.

10. The device according to claim 1, wherein the guides comprise metal guide rings.

11. The device according to claim 1, wherein the plurality of guides comprises at least three guide rings.

12. The device according to claim 1, wherein the plurality of guides comprise guides arranged in pairs overlapping one after another along a longitudinal direction of the main strap.

13. The device according to claim 1, wherein the main strap is free of tension in a longitudinal direction of the main strap as the delay element actuates from the delaying position to the deployment position.

14. The device according to claim 1, wherein the main strap and the delaying strap comprise webbing.

15. The device according to claim 1, wherein the parachute comprises a personnel parachute or a cargo parachute.

16. A parachute system comprising:
    a drogue parachute detachably connectable to an aircraft;
    a delay element connecting the drogue parachute to a parachute bridal line, and
    a parachute connected to the parachute bridal line;
    wherein the delay element is actuatable from a delaying position, in which no deployment of the parachute connected to the parachute bridal line takes place, to a deployment position, in which the parachute connected to the parachute bridal line is deployed;
    wherein the delay element comprises a main strap, a delaying strap, and a plurality of guides connected to the main strap; and
    wherein the plurality of guides frictionally engage with and deflect the delaying strap passing circuitously therethrough as the delay element actuates from the delaying position to the deployment position.

17. A method for delaying the opening of a parachute, wherein the parachute is a personnel parachute attached to a person exiting an aircraft or a cargo parachute attached to cargo dropped from the aircraft, the method comprising:
    providing the parachute system according to claim 16; and
    connecting the drogue parachute of the parachute system to the aircraft; and
    attaching the parachute to the person exiting the aircraft or the cargo dropped from the aircraft;
    wherein the drogue parachute is released when the person exits the aircraft or when the cargo is dropped, and the drogue parachute acts on the delay element operably coupling the drogue parachute to the parachute bridal line connected to the parachute; and
    wherein the delay element actuates from the delaying position, in which no deployment of the parachute connected to the parachute bridal line takes place, to the deployment position, in which the parachute connected to the parachute bridal line is deployed.

18. The method according to claim 17, wherein the delay element further comprises a first end and a second end, and wherein a distance between the first end and the second end increases as the delay element actuates from the delaying position to the deployment position.

19. The method according to claim 17, wherein actuation of the delay element from the delaying position to the deployment position occurs between 0.5 seconds and 2 seconds.

* * * * *